(12) United States Patent
Namba et al.

(10) Patent No.: US 11,703,573 B2
(45) Date of Patent: Jul. 18, 2023

(54) DISTANCE MEASUREMENT DEVICE AND DISTANCE MEASUREMENT METHOD

(71) Applicant: Sony Semiconductor Solutions Corporation, Kanagawa (JP)

(72) Inventors: Kazuhide Namba, Kanagawa (JP); Yusuke Moriyama, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 1009 days.

(21) Appl. No.: 16/463,472

(22) PCT Filed: Nov. 28, 2017

(86) PCT No.: PCT/JP2017/042631
§ 371 (c)(1),
(2) Date: May 23, 2019

(87) PCT Pub. No.: WO2018/101262
PCT Pub. Date: Jun. 7, 2018

(65) Prior Publication Data
US 2019/0353754 A1   Nov. 21, 2019

(30) Foreign Application Priority Data
Nov. 30, 2016   (JP) .................................. 2016-233407

(51) Int. Cl.
*G01S 7/484* (2006.01)
*G01C 3/06* (2006.01)
(Continued)

(52) U.S. Cl.
CPC ................ *G01S 7/484* (2013.01); *G01C 3/06* (2013.01); *G01S 17/10* (2013.01); *G01S 17/931* (2020.01)

(58) Field of Classification Search
CPC ......... G01C 3/06; G01S 17/10; G01S 17/894; G01S 17/931; G01S 7/484
See application file for complete search history.

(56) References Cited

U.S. PATENT DOCUMENTS

2012/0075534 A1*  3/2012  Katz .................... H04N 9/3194
                                                   348/602
2014/0320692 A1   10/2014  Ichikawa
2018/0128919 A1*  5/2018  Ichikawa ................ G01S 17/10

FOREIGN PATENT DOCUMENTS

CN         1854760 A     11/2006
CN       102378920 A      3/2012
(Continued)

OTHER PUBLICATIONS

International Search Report and English translation thereof dated Feb. 13, 2018 in connection with International Application No. PCT/JP2017/042631.

(Continued)

*Primary Examiner* — Maria E Vazquez Colon
(74) *Attorney, Agent, or Firm* — Wolf, Greenfield & Sacks, P.C.

(57) ABSTRACT

The present technology relates to a distance measurement device and a distance measurement method that can easily suppress interference.

A first frame being a period that a distance to a target object is calculated includes a plurality of subframes being periods that irradiation light is emitted, and the emission of the irradiation light is controlled so that timing of head subframes differs between a first frame and a second frame following the first frame, and intervals between the subframes become constant during the period of the first frame.

(Continued)

The present technology can be applied to a case where distance measurement for measuring a distance is performed.

18 Claims, 12 Drawing Sheets

(51) Int. Cl.
  *G01S 17/10* (2020.01)
  *G01S 17/931* (2020.01)

(56) References Cited

FOREIGN PATENT DOCUMENTS

| CN | 104125411 | A | | 10/2014 |
|----|-----------|---|---|---------|
| CN | 105723239 | A | | 6/2016 |
| EP | 2594959 | A1 | | 5/2013 |
| JP | 05-052957 | A | | 3/1993 |
| JP | H0552957 | A | * | 3/1993 |
| JP | H0727859 | A | | 1/1995 |
| JP | 2008164496 | A | | 7/2008 |
| JP | 2011-022089 | A | | 2/2011 |
| JP | 2012-227892 | A | | 11/2012 |
| JP | 2014-216940 | A | | 11/2014 |
| JP | 2016-090268 | A | | 5/2016 |
| JP | 2016090268 | A | * | 5/2016 |
| WO | WO 2013/127973 | A1 | | 9/2013 |
| WO | WO-2013127973 | A1 | * | 9/2013 | ............. G01S 17/89 |

OTHER PUBLICATIONS

International Written Opinion and English translation thereof dated Feb. 13, 2018 in connection with International Application No. PCT/JP2017/042631.
International Preliminary Report on Patentability and English translation thereof dated Jun. 13, 2019 in connection with International Application No. PCT/JP2017/042631.
Extended European Search Report dated Oct. 25, 2019 in connection with European Application No. 17875560.9.

* cited by examiner

DISTANCE MEASUREMENT DEVICE AND DISTANCE MEASUREMENT METHOD

CROSS-REFERENCE TO RELATED APPLICATIONS

This application claims the benefit under 35 U.S.C. § 371 as a U.S. National Stage Entry of International Application No. PCT/JP2017/042631, filed in the Japanese Patent Office as a Receiving Office on Nov. 28, 2017, which claims priority to Japanese Patent Application Number JP2016-233407, filed in the Japanese Patent Office on Nov. 30, 2016, each of which is hereby incorporated by reference in its entirety.

TECHNICAL FIELD

The present technology relates to a distance measurement device and a distance measurement method and, more particularly, relates to a distance measurement device and a distance measurement method that can easily suppress interference for example.

BACKGROUND ART

As a distance measurement device (sensor) that performs distance measurement for measuring a distance to a target object for example, there is a time of flight (TOF) sensor (for example, see Patent Document 1).

In the TOF sensor, by emitting irradiation light which is light to be emitted to the target object and receiving reflected light, which is the irradiation light reflected by the target object, time between the emission of the irradiation light and the reception of the reflected light, that is, time $\Delta t$ until the irradiation light returns after being reflected by the target object can be obtained. Then, by using the time $\Delta t$ and a light speed $c[m/s]$, distance L to the target object can be obtained according to an equation, $L=c\times\Delta t/2$.

CITATION LIST

Patent Document

Patent Document 1: Japanese Patent Application Laid-Open No. 2016-090268

SUMMARY OF THE INVENTION

Problems to be Solved by the Invention

In recent years, practical usage of the automatic operation has been demanded; however, in the automatic operation, distance measurement for measuring a distance to an object existing around the vehicle is needed. Regarding such distance measurement, in a case where a TOF sensor is used, it is assumed that a plurality of TOF sensors are mounted in the vehicle to measure a distance to objects existing in each direction of the vehicle.

In this case, in the plurality of TOF sensors mounted in the vehicle, an occurrence of interference that irradiation light (irradiation light itself and reflected light of the irradiation light) emitted from one TOF sensor is mixed to light to be received by another TOF sensor is anticipated.

Furthermore, in a case where a number of vehicles that perform the automatic operation increases, an occurrence of interference that irradiation light emitted from a TOF sensor mounted in one vehicle is received by a TOF sensor mounted in another vehicle is anticipated.

In a case where interference occurs with the TOF sensors, accuracy of the distance measurement is lowered.

The present technology has been made in view of such situation and has an object to easily suppress interference in the distance measurement and maintain the accuracy of the distance measurement.

Solutions to Problems

The distance measurement device according to the present technology is a distance measurement device including a light emitting unit configured to emit irradiation light, a light receiving unit configured to receive reflected light which is the irradiation light reflected by a target object, a calculation unit configured to calculate a distance to the target object on the basis of time between the emission of the irradiation light and the reception of the reflected light, and a control unit configured to control the emission of the irradiation light, in which a first frame being a period that the distance is calculated includes a plurality of subframes being periods that the irradiation light is emitted, and the control unit controls the emission of the irradiation light so that, between the first frame and a second frame following the first frame, timing of head subframes differs and, during the period of the first frame, intervals between the subframes become constant.

The distance measurement method according to the present technology is a distant measurement method of a distance measurement device including a light emitting unit configured to emit irradiation light, a light receiving unit configured to receive reflected light which is the irradiation light reflected by a target object, a calculation unit configured to calculate a distance to the target object on the basis of time between the emission of the irradiation light and the reception of the reflected light, and a control unit configured to control the emission of the irradiation light. The control unit of the distance measurement device, in which a first frame being a period that a distance is calculated includes a plurality of subframes being periods that the irradiation light is emitted, controls the emission of the irradiation light so that timing of head subframes differs between the first frame and a second frame following the first frame and, during the period of the first frame, intervals between the subframes become constant.

In the distance measurement device and the distance measurement method according to the present technology, irradiation light is emitted and reflected light which is the irradiation light reflected by the target object is received. Then, a distance to the target object is calculated on the basis of time between the emission of the irradiation light and the reception of the reflected light. In the first frame, which is a period that a distance is calculated, a plurality of subframes, which are periods that the irradiation light is emitted, are included, and the emission of the irradiation light is controlled so that timing of head subframes differs between the first frame and a second frame following the first frame and, during the period of the first frame, intervals between the subframes become constant.

Another distance measurement device according to the present technology is a distance measurement device including a light emitting unit configured to emit irradiation light, a light receiving unit configured to receive reflected light which is the irradiation light reflected by a target object, a calculation unit configured to calculate a distance to the target object on the basis of time between the emission of the irradiation light and the reception of the reflected light, a random number generation unit configured to generate a random number on the basis of information generated in the light receiving unit, and a control unit configured to control at least a part of the emission of the irradiation light on the basis of the random number.

In the another distance measurement device according to the present technology, irradiation light is emitted and reflected light which is the irradiation light reflected by the target object is received. Then, a distance to the target object is calculated on the basis of time between the emission of the irradiation light and the reception of the reflected light. Furthermore, the random number is generated on the basis of the information generated in the light receiving unit and at least a part of the emission of the irradiation light is controlled on the basis of the random number.

Note that the distance measurement device may be an independent device or may be an internal block composing a device.

Effects of the Invention

According to the present technology, interference can be easily suppressed in distance measurement.

Note that effects described here should not be limited and there may be any one of the effects described in this disclosure.

MODE FOR CARRYING OUT THE INVENTION

<Embodiment of Distance Measurement Device to which the Present Technology is Applied>

Figure 1:
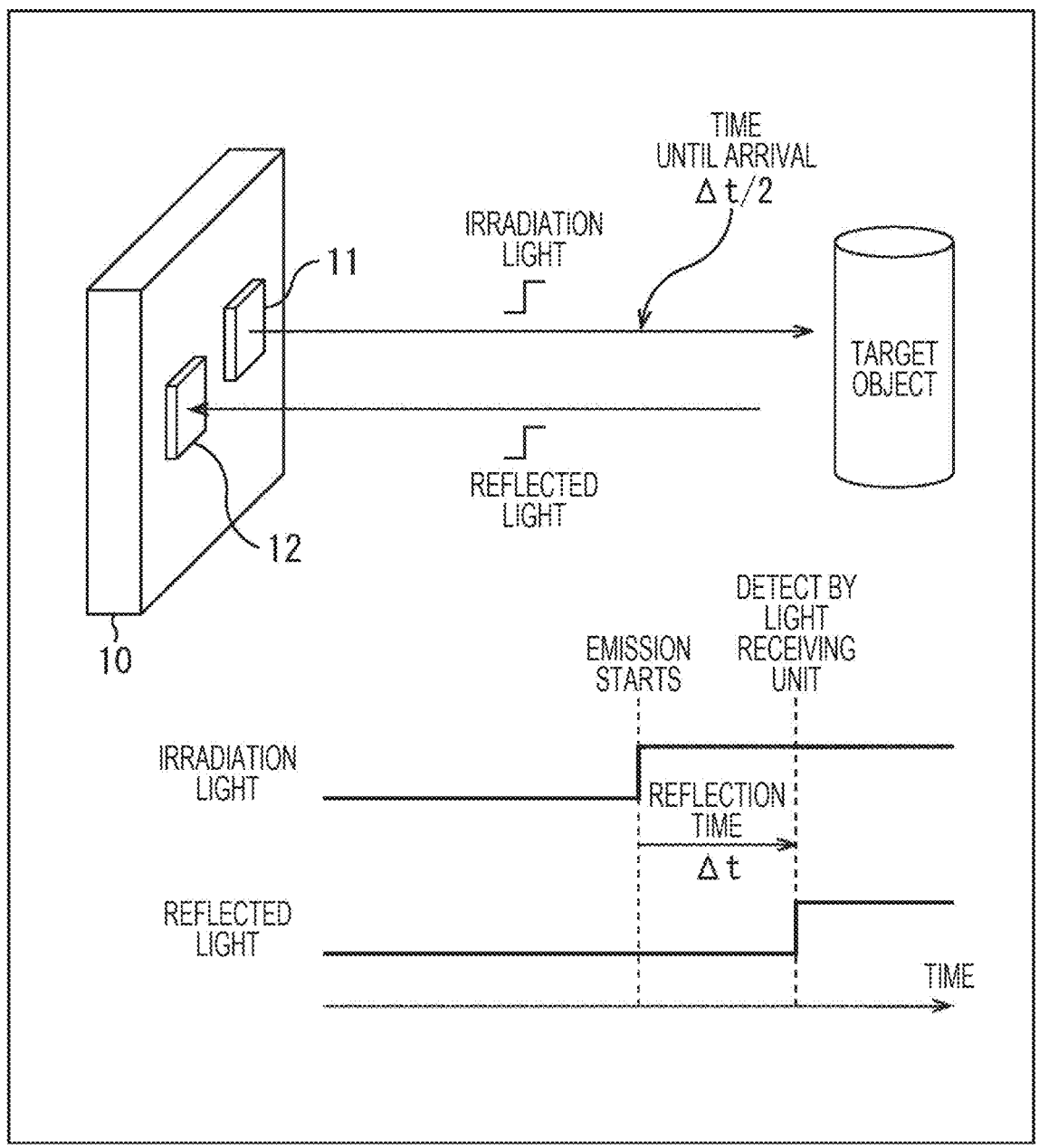
FIG. 1 is diagram for explaining an outline of an embodiment of a distance measurement device to which the present technology is applied.

FIG. 1 is a diagram explaining an outline of an embodiment of a distance measurement device to which the present technology is applied.

A distance measurement device 10 includes a light emitting unit 11 and a light receiving unit 12 and measures a distance to a target object using a TOF system.

The light emitting unit 11 emits irradiation light which is predetermined modulated light or the like of pulsed light or the like to be emitted to the target object. For example, light in an invisible region such as infrared light is emitted as modulating the light at high speed and the light is emitted toward a detection area. Note that, as a light source that emits light to the detection area, a light emitting diode may be used or another light source such as a laser diode may be used.

The light receiving unit 12 receives reflected light which is the irradiation light reflected by the target object. As the light receiving unit 12, for example, a system for applying voltage to switch electrodes (for example, a current assisted photonic demodulator (CAPD)), a method for switching electrodes by using a gate, or various sensors such as a single photon avalanche diode (SPAD), or an avalanche photodiode (APD) can be used.

Furthermore, the light emitting unit 11 and the light receiving unit 12 may be provided adjacent to each other. With this configuration, in a case where the emitted light reflects at the target object and returns to the light receiving unit 12, a difference between an on-going path and a returning path becomes minimum and an error in the distance measurement can be reduced. Furthermore, the light emitting unit 11 and the light receiving unit 12 may be integrally formed within a single housing. With this configuration, in a case where the emitted light reflects at an object and returns to the light receiving unit 12, variation in the on-going path and the returning path can be suppressed and an error in the distance measurement can be reduced.

The distance measurement device 10 is, for example, mounted in a vehicle. As an application example, there is an automatic parking function of a vehicle. In a known automatic parking function, an ultrasonic sensor is used as a method for detecting a vehicle traveling nearby or an object located nearby; however, the distance measurement device 10 of the technology according to the present disclosure may be used as a substitute. Alternatively, an ultrasonic sensor and the distance measurement device 10 of the technology according to the present disclosure may both be used. Positions where the distance measurement devices 10 are mounted in a vehicle may be positions corresponding to image pickup units 12101, 12102, 12103, and 12104 in FIG. 11, for example. Alternatively, the distance measurement devices 10 may be respectively mounted at corners of front and rear bumpers of the vehicle one by one, at four places in total. Alternatively, the distance measurement devices 10 may be mounted at eight places in total at front, rear, left, and right corners of the bumpers of the vehicle. A measurable distance is equal to or greater than one meter and equal to or shorter than 30 meters, for example. However, this does not set any limitation and a distance equal to or shorter than one meter may be measured or a distance equal to or greater than 30 meters may be measured.

In a case where a TOF sensor is used as a vehicle automatic parking function, it is assumed that there may be more than one vehicle having the TOF sensor in a parking area. In such a case, occurrence of interference that irradiation light emitted in a light emitting unit mounted in a vehicle is received by a TOF sensor mounted in another vehicle is assumed. Here, with the distance measurement device 10 of the technology according to the present disclosure, the interference can be suppressed.

In the distance measurement device 10, a distance L to a target object is calculated on the basis of time (hereinafter, also referred to as reflection time) Δt from emission of irradiation light by the light emitting unit 11 until reception of the reflected light by the light receiving unit 12.

In other words, the reflection time Δt is time from when irradiation light is emitted until when it returns after reflected by the target object, and in a case where light speed is represented by c[m/s], the distance L to the target object can be acquired on the basis of equation L=c×Δt/2.

Thus, the distance L to the target object can be acquired by obtaining reflection time Δt and, in a TOF sensor including the distance measurement device 10, there are a first calculation method and a second calculation method as a method for obtaining the reflection time Δt, for example.

<First Calculation Method of Reflection Time Δt>

Figure 2:
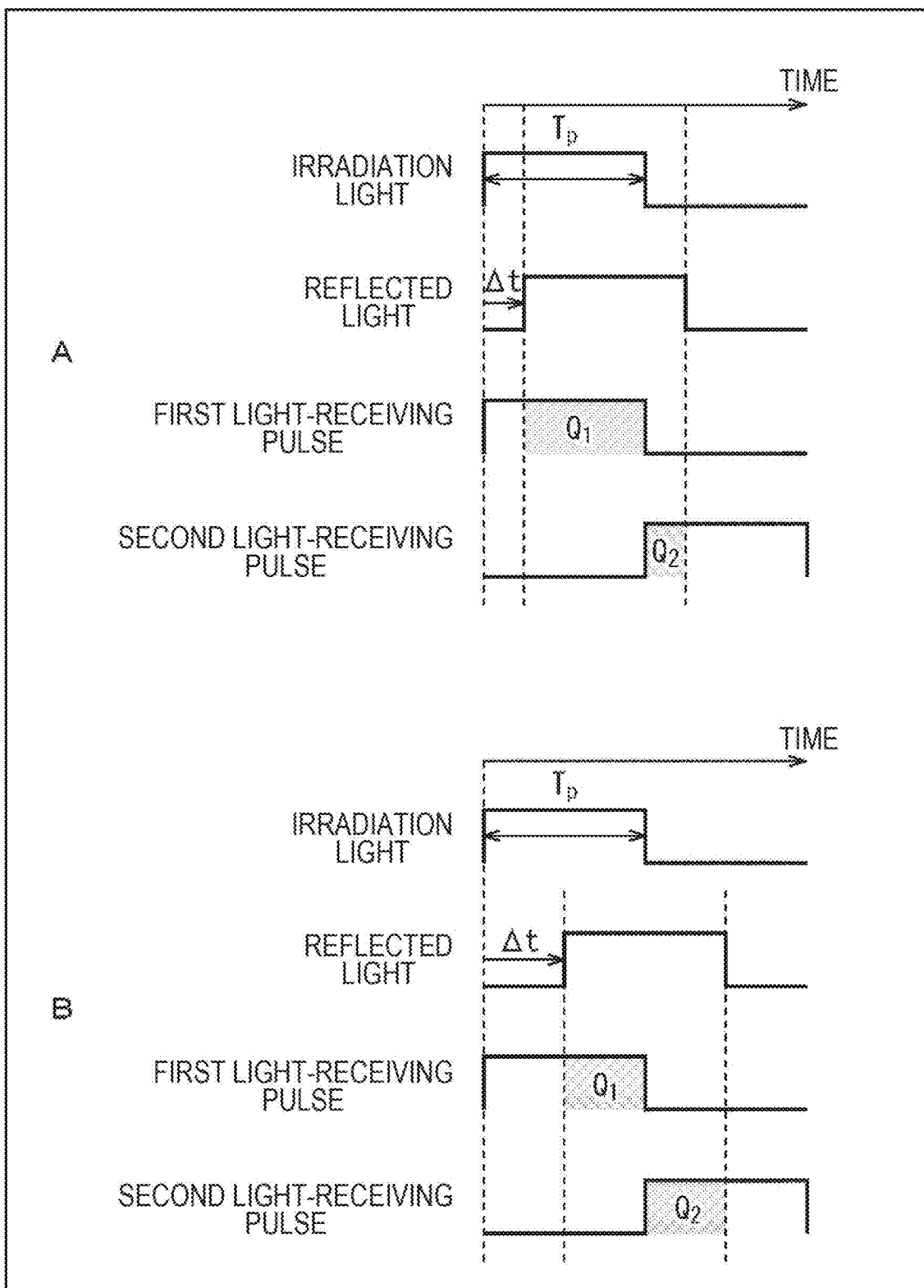
FIG. 2 is a diagram for explaining a principle of a first calculation method of reflection time Δt.

FIG. 2 is a diagram for explaining a principle of the first calculation method of the reflection time Δt.

Note that, in the following, pulsed light having a predetermined pulse width Tp is used as irradiation light, for example.

In a TOF sensor, irradiation light is emitted, and reflected light of the irradiation light (the reflected light that the irradiation light is reflected by the target object) is received after reflection time Δt corresponding to the distance L to the target object has passed.

Here, a pulse having a same pulse width and a same phase with the pulsed light as the irradiation light is referred to as a first light-receiving pulse, and a pulse having a same pulse width with the pulsed light as the irradiation light and having a phase shifted by a pulse width Tp of the pulsed light is referred to as a second light-receiving pulse.

In the first calculation method, reflected light is received during periods of a period of the first light-receiving pulse (High (H) level) and a period of the second light-receiving pulse.

Here, an electric charge amount (light-receiving amount) of the reflected light received during the period of the first light-receiving pulse is represented by $Q_1$, and an electric charge amount of the reflected light received during the period of the second light-receiving pulse is represented by $Q_2$.

In this case, the reflection time Δt can be obtained on the basis of an equation, $\Delta t = Tp \times Q_2/(Q_1+Q_2)$.

Here, since the reflection time Δt is proportional to the electric charge amount $Q_2$, the electric charge amount $Q_2$ becomes small in a case where the distance L to the target object is a short distance, and the electric charge amount $Q_2$ becomes large in a case where the distance L to the target object is a long distance.

A of FIG. 2 illustrates the irradiation light, reflected light, first pulse, second pulse, electric charge amounts $Q_1$ and $Q_2$ in a case where the distance L to the target object is a short distance, and B of FIG. 2 illustrates the irradiation light, reflected light, first pulse, second pulse, and electric charge amounts $Q_1$ and $Q_2$ in a case where the distance L to the target object is a long distance.

Here, in actual, since environment light is also received in addition to the reflected light during the periods of the first and second light-receiving pulses, an electric charge amount of the environment light needs to be canceled to calculate the reflection time Δt (also, the distance L). Note that, in this embodiment, for the sake of simplicity, explanation of the cancellation of the electric charge amount of the environment light will be omitted.

<Second Calculation Method of Reflection Time Δt>

Figure 3:
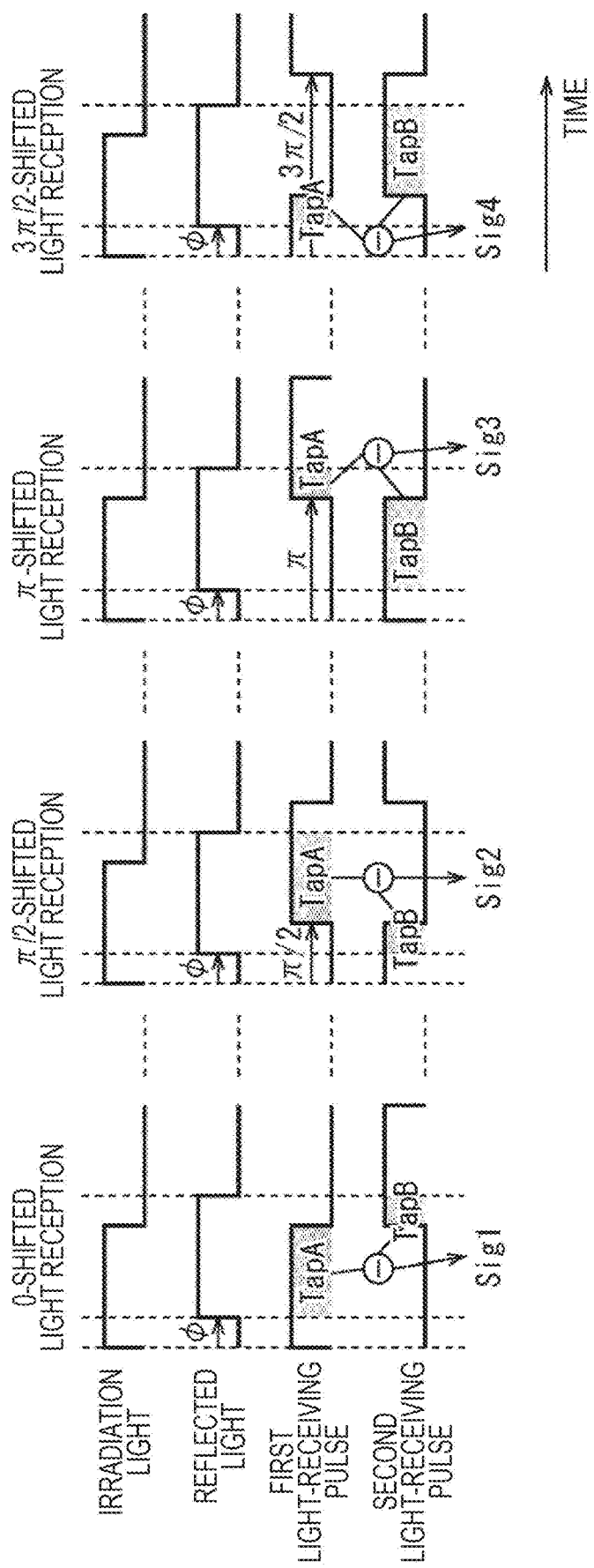
FIG. 3 is a diagram for explaining a principle of a second calculation method of the reflection time Δt.

FIG. 3 is a diagram for explaining a principle of the second calculation method of the reflection time Δt.

In the second calculation method, pulsed light as the irradiation light is emitted more than one time, four times, for example.

Then, for the four-time pulsed light emissions, a 0-shifted light reception, a π/2-shifted light reception, a π-shifted light reception, and a 3π/2-shifted light reception are performed, respectively.

In the θ-shifted light reception, the reflected light is received as shifting the first and second light-receiving pulses by θ [rad] from the case of the first calculation method. Note that the phase of the pulse width Tp of the pulsed light as the irradiation light is π.

Here, in the θ-shifted light reception, the electric charge amount of the reflected light received during a period of the first light-receiving pulse is represented by TapA, and the electric charge amount of the reflected light received during the second light-receiving pulse is represented by TapB.

Furthermore, differences TapA-TapB between the electric charge amounts TapA and TapB obtained in the 0-shifted light reception, π/2-shifted light reception, π-shifted light reception, and 3π/2-shifted light reception are represented by difference signals Sig1, Sig2, Sig3, and Sig4 respectively.

In this case, a phase difference φ between the irradiation light and reflected light can be obtained on the basis of an equation, $\varphi = \arctan((Sig2-Sig4)/(Sig1-Sig3))$. The phase difference φ and the reflection time Δt are corresponding one by one and, with the phase difference φ, the reflection time Δt can be obtained on the basis of an equation, $\Delta t = Tp \times \varphi/\pi$.

The present technology may be applied to any one of the first and second calculation methods; however, in the following, description will be given as taking the second calculation method of the first and second calculation methods, as an example.

<Example of Distance Measurement>

Figure 4:
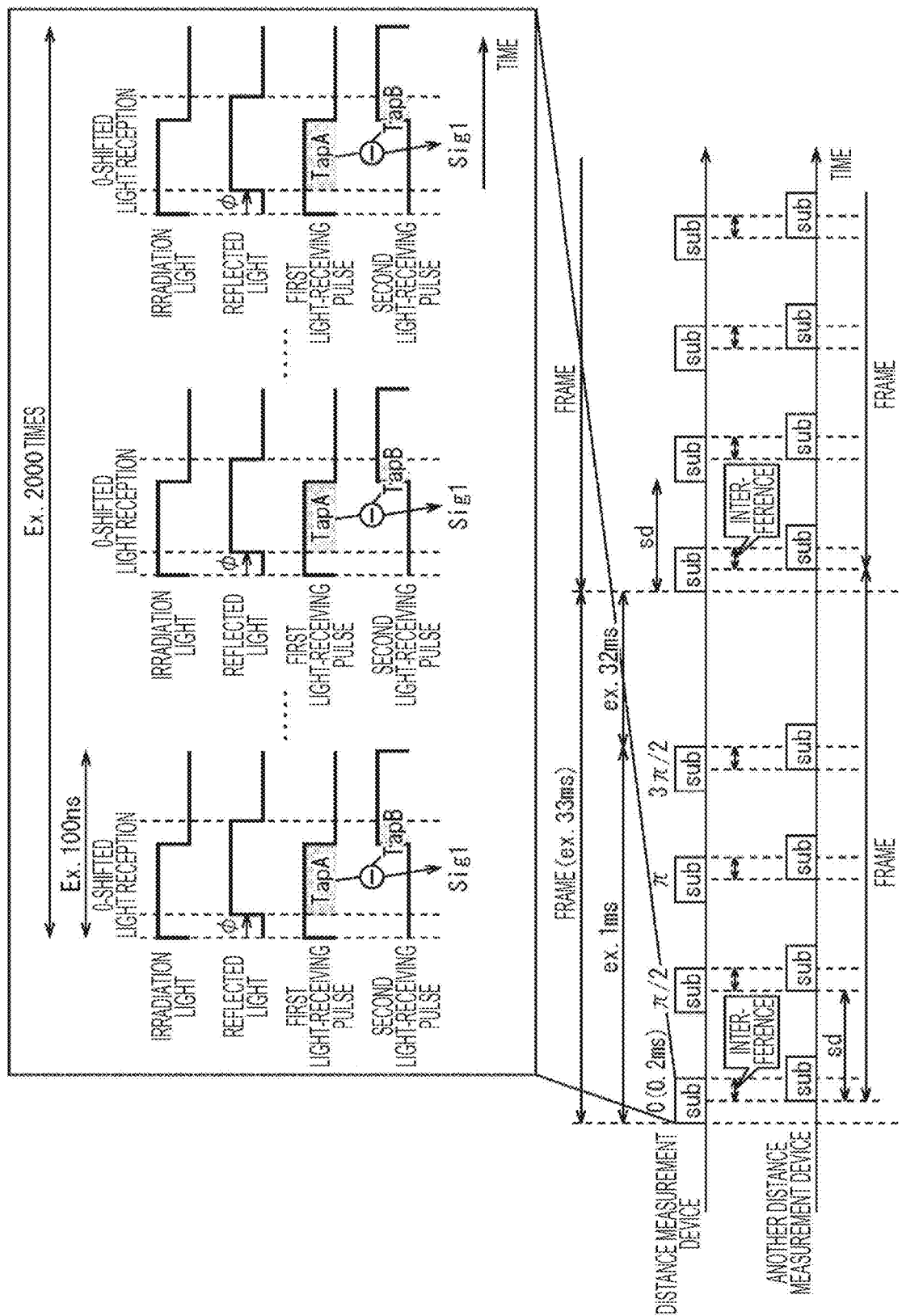
FIG. 4 is a timing chart for explaining an example of distance measurement in a case where a distance measurement device, which is a TOF sensor, obtains the reflection time Δt by using the second calculation method.

FIG. 4 is a timing chart for explaining an example of a distance measurement in a case where a distance measurement device, which is a TOF sensor (a distance measurement device which is not the distance measurement device 10 in FIG. 1), obtains reflection time Δt using the second calculation method.

In the distance measurement device, by assuming a period of calculating the distance L to the target object as a frame, the distance L is calculated in units of frames. In FIG. 4, a length of a frame (frame length) is 33 [ms], for example.

The frame includes a plurality of subframes sub, which are periods that irradiation light is emitted.

In FIG. 4, a length of the subframe (subframe length) is 0.2 [ms], for example.

Furthermore, in FIG. 4, the frame includes four subframes sub, for example, and the four subframes sub are arranged from a head of the frame with a predetermined constant intervals sd. The length from a head to an end of the four subframes sub is 1 [ms], for example, and thus, in the frame of FIG. 4, there are the four subframes sub during a period of 1 [ms] from the head and the rest period of 32 (=33−1) [ms] is a period during which there is no subframe.

The frame of FIG. 4 is not limited to this configuration and further one or more set of four subframes sub corresponding to four phases may be included in the rest period of 32 [ms]. In this case, an average value of the plurality of subframes can be obtained and distance measurement accuracy can be further improved compared to a case where only the four subframes sub are used. Here, in a case where an average value is obtained, any one of arithmetic mean, weighted mean, geometric mean, harmonic mean, and the like may be used.

Furthermore, in the rest period of 32 [ms], a subframe used to measure data related to ambient light may be provided. A measured value of the ambient light is stored in an unillustrated memory. A distance calculation unit 51 can obtain phase difference information of four subframes sub, from which an ambient light element has been removed, by subtracting the ambient light measured value stored in the memory from measured values of the four subframes sub, and this further improves the distance measurement accuracy. Note that the measured value of the ambient light measured here may be used in a later described random number generation unit.

Within the frame, the 0-shifted light reception, π/2-shifted light reception, π-shifted light reception, and 3π/2-shifted light reception are respectively performed in the fourth subframes sub.

In the subframe sub, as assuming that time for one irradiation light emission and one θ-shifted light reception (for example, time corresponding to a phase of 2π) is 100 [ns] for example, the time for irradiation light emission and θ-shifted light reception are repeated for a plurality of times, for example, 2000 times or the like.

In the calculation of the phase difference φ between the irradiation light and reflected light explained in FIG. 3, a sum of the electric charge amount of the reflected light that is received for a plurality of times, such as 2000 times is used.

Note that, in a case where another distance measurement device exists near the one distance measurement device, at least a part of the subframes sub of the one distance measurement device and the subframes sub of the another distance measurement device may be definitely overlapped.

As described above, in the frame, in a case where the four subframes sub are arranged from the head of the frame with a constant intervals sd and subframes sub of one frame of one distance measurement device overlaps with subframes sub of another distance measurement device, the overlapping of the subframes sub with the another distance measurement device continues in following frames of the one distance measurement device.

During a period in which the subframes sub are overlapped, in the one distance measurement device, an interference that irradiation light emitted from the another distance measurement device is received in addition to the irradiation light emitted from the one distance measurement device.

The interference affects the electric charge amount TapA (or $Q_1$ during the period of the first light-receiving pulse or the electric charge amount TapB (or $Q_2$) during the period of the second light-receiving pulse and causes a reduction of the distance measurement accuracy.

In the frame, in a case where the four subframes sub are arranged from the head of the frame with the constant intervals sd, the interference as described above may not be resolved until the another distance measurement device is moved from the surrounding of the one distance measurement device, for example.

Figure 5:
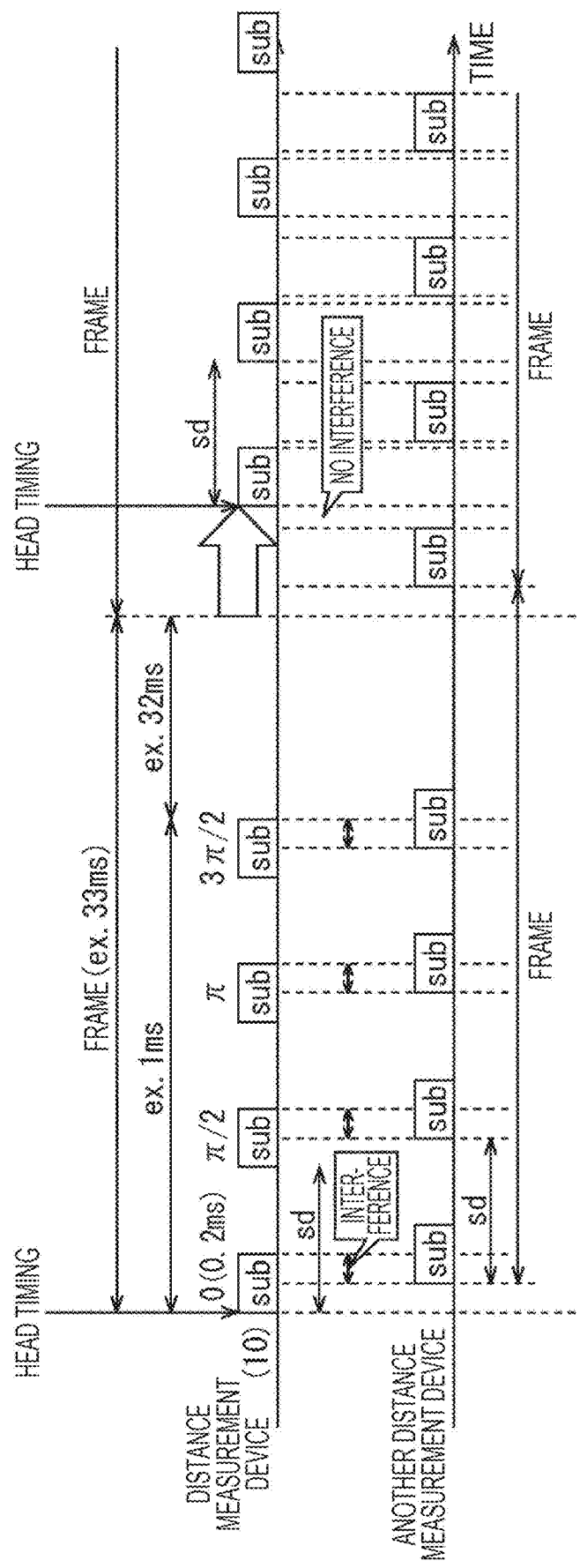
FIG. 5 is a timing chart for explaining an example of distance measurement in a case where a distance measurement device 10 obtains the reflection time Δt by using the second calculation method.

FIG. 5 is a timing chart for explaining an example of distance measurement in a case where the distance measurement device 10 of FIG. 1 obtains the reflection time Δt by using the second calculation method.

As explained with reference to FIG. 4, in a case where the plurality of subframes sub are arranged, in each frame, from the head of the frame at constant intervals sd and an overlap of the subframes sub occurs with the another distance measurement device, the overlap of the subframes sub continues in following frames and interference is kept generated.

Then, in the distance measurement device 10, emission of the irradiation light (and reception of reflected light of the irradiation light) are controlled so that timing of the subframe sub in the heads differs in a first frame as one frame and a second frame following the first frame and the intervals sd between the subframes become constant.

In FIG. 5, the distance measurement device 10 controls emission of the irradiation light in the first frame so that the plurality of subframes sub are arranged from the head of the frame at the constant intervals sd, as in the case of FIG. 4.

Then, the distance measurement device 10 controls emission of the irradiation light in a following frame so that the plurality of subframes sub are arranged at constant intervals sd from timing that predetermined time greater than 0 has passed from the head of the frame.

Here, the timing that the subframe sub in the head of the plurality of subframes sub within the frame is referred to as head timing.

The distance measurement device 10 controls emission of the irradiation light so that the head timing is changed as maintaining the intervals sd constant between the subframes in the first frame, which is the one frame, and the second frame following the first frame.

As described above, interference can be suppressed by controlling emission of the irradiation light so that the head timing differs in the first frame and the second frame following the first frame and the intervals between the subframes during the period of the first frame (and the second frame) are maintained constant.

In other words, in FIG. 5, in the first frame in the distance measurement device 10, overlap of subframes sub has occurred with another distance measurement device and interference has occurred, as in the case of FIG. 4.

However, in a following frame in the distance measurement device 10, since the head timing is different from the first frame, subframes sub are not overlapped and interference has not occurred with the another distance measurement device.

Here, in the distance measurement device 10, the head timing can be changed according to a predetermined pattern or can be changed in a random manner, for example. A possibility of suppressing interference can be improved by shifting the head timing in a random manner, compared to by shifting according to a predetermined pattern.

Note that, in view of improving the possibility of suppressing interference, the possibility of suppressing interference can be improved by changing start timing of subframe (a position of the subframe) in units of subframes in a random manner, compared to by changing the head timing in units of frames in a random manner.

However, in a case where start timing of the subframes is randomly changed in units of subframes, a process for controlling emission of the irradiation light (and reception of reflected light of the irradiation light) and a circuit therefor become complexed, compared to a case where the head timing is randomly changed in units of frames.

In other words, in a case where the head timing is randomly changed in units of frames, the process for controlling emission of the irradiation light and a circuit therefor are simplified and this results in that interference can be easily suppressed, compared to the case where the start timing of the subframes is randomly changed in units of subframes.

Further, in a case where the head timing is randomly changed in units of frames, consumed power can be reduced, compared to a case where the start timing of subframes is randomly changed in units of subframes.

Figure 6:
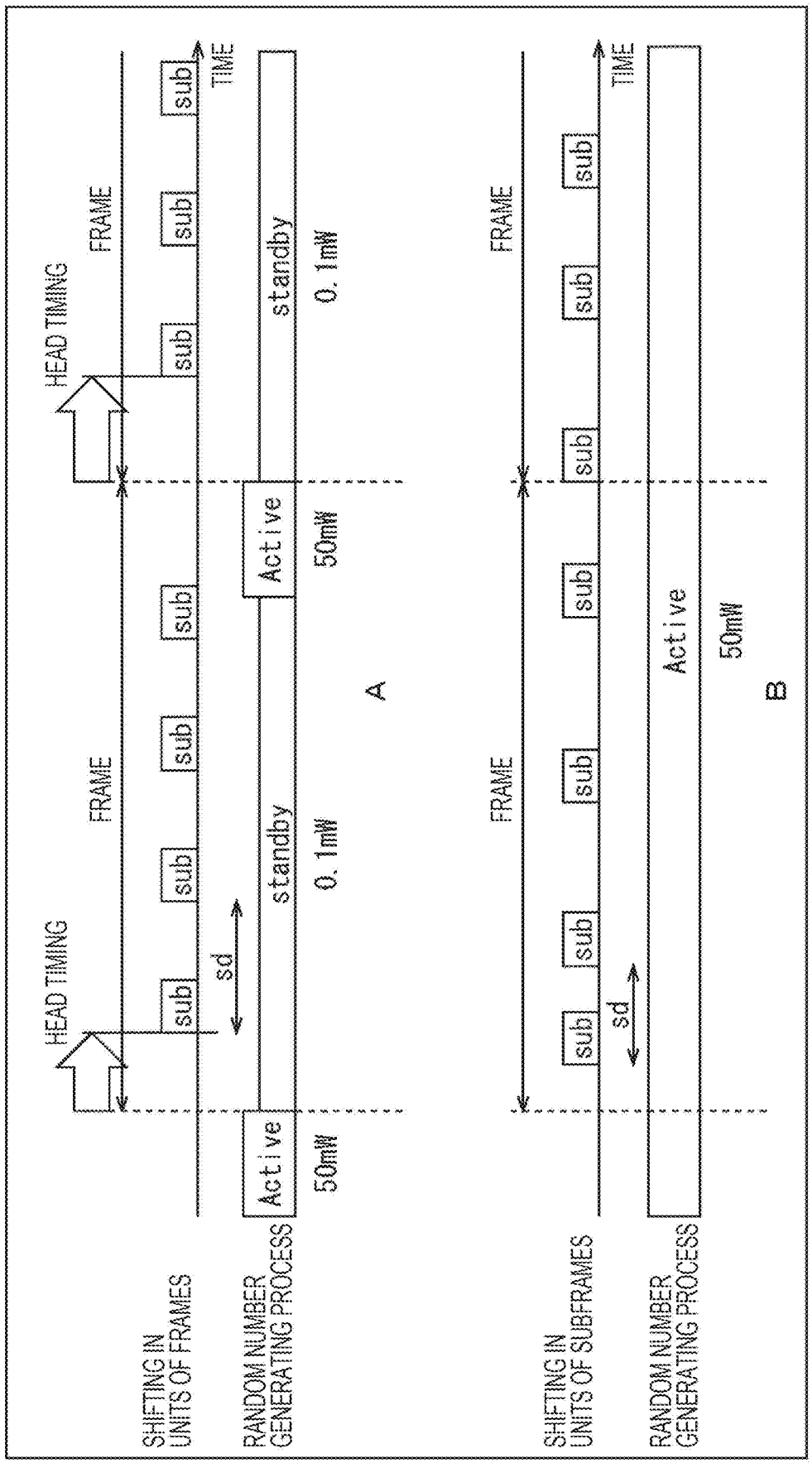
FIG. 6 is a diagram for explaining examples of consumed power in a case where head timing is randomly changed in units of frames and in a case where start timing of subframes is randomly changed in units of subframes.

FIG. 6 is a diagram illustrating examples of consumed power in a case where the head timing is randomly changed in units of frames and a case where the start timing of subframes is randomly changed in units of subframes.

As a method for randomly changing (shifting) the head timing in units of frames, for example, a method for controlling the head timing on the basis of a random number can be used. In a similar manner, as a method for randomly changing (shifting) the start timing of subframes in units of subframes, a method for controlling the start timing of the subframes on the basis of a random number can be used.

In a case where the control based on a random number as described above is performed, a random number generating process for generating a random number used in the control needs to be performed.

A of FIG. 6 illustrates an example of states of a random number generating process in a case where the head timing is randomly changed in units of frames.

In a case where the head timing is randomly changed in units of frames, a random number to be used in the control of the head timing of the frame only needs to be obtained at least before the frame starts. Thus, the random number generating process can be made in an active state, which is a state for generating a random number, only during a predetermined period immediately before the frame starts and can be made in a standby state to be standby to shift to an active state, in other periods.

In FIG. 6, the consumed power in a case where the random number generating process is in an active state is 50 [mW] and the consumed power in a case where the random number generating process is in a standby state is 0.1 [mW].

Thus, the consumed power can be suppressed by making the random number generating process in an active state only during the predetermined period immediately before the frame starts and in a standby state in other periods.

B of FIG. 6 illustrates an example of a state of the random number generating process in a case where the start timing of the subframes is randomly changed in units of subframes.

In a case where the start timing of the subframes is randomly changed in units of subframes, a random number to be used in the control of the start timing of the subframes is needed appropriately. Thus, the random number generating process needs to be in an active state all the time.

Thus, in a case of B of FIG. 6, the consumed power becomes greater than the case of A of FIG. 6 in which the random number generating process can be made in an active state only during the predetermined period immediately before the frame starts and in a standby state during other periods.

<First Configuration Example of Distance Measurement Device 10>

Figure 7:
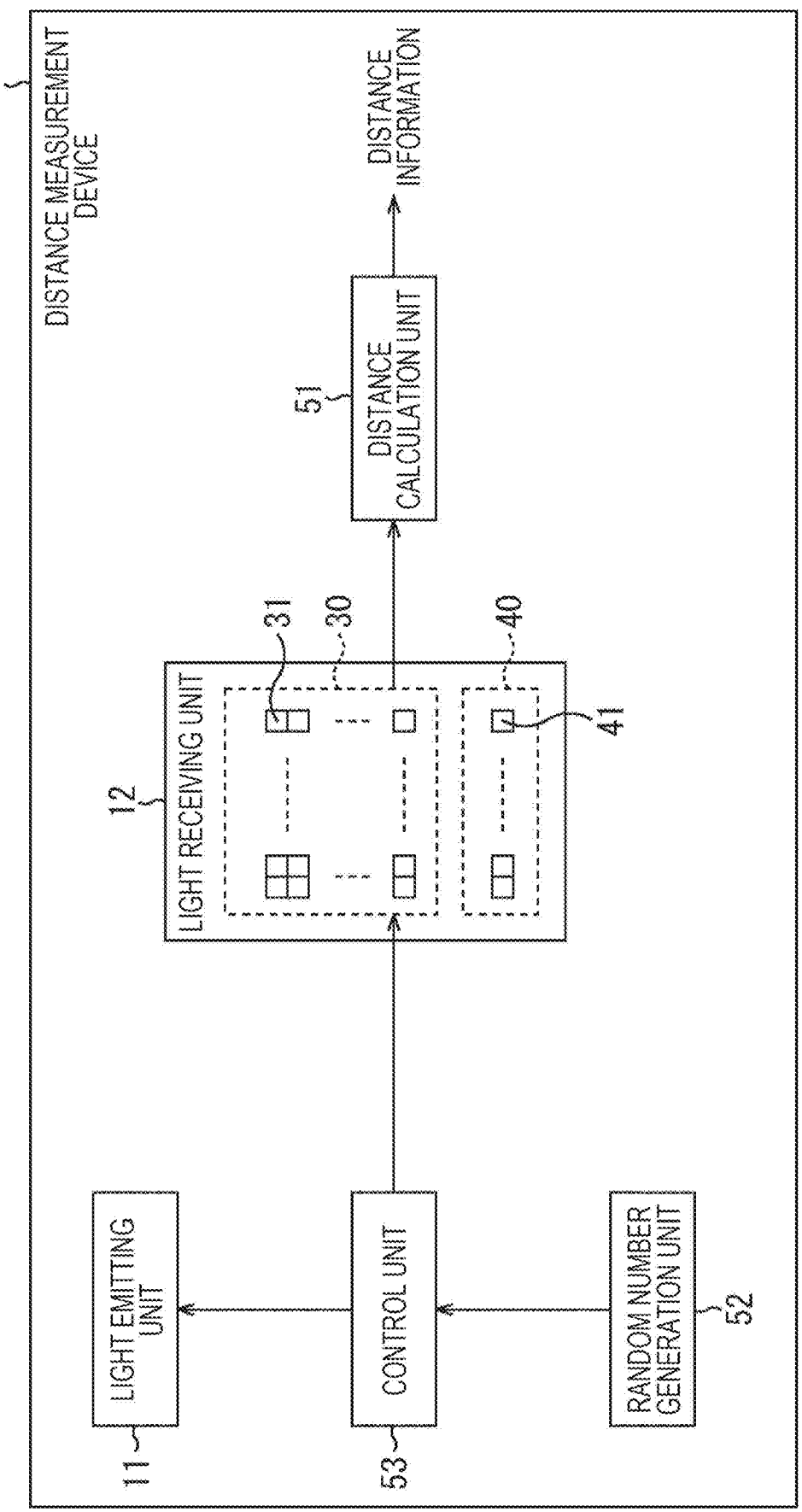
FIG. 7 is a block diagram illustrating a first electrical configuration example of the distance measurement device 10.

FIG. 7 is a block diagram illustrating a first electrical configuration example of the distance measurement device 10 of FIG. 1.

In FIG. 7, the distance measurement device 10 includes the light emitting unit 11, the light receiving unit 12, the distance calculation unit 51, a random number generation unit 52, and a control unit 53.

The light emitting unit 11 includes a light emitting diode (LED) or the like for example and emits irradiation light according to control by the control unit 53.

The light receiving unit 12 includes an effective pixel area 30 and a dummy pixel area 40.

The effective pixel area 30 has a plurality of pixels 31 and the dummy pixel area 40 has a plurality of pixels 41.

The pixels 31 and 41 include a photodiode (PD) or the like for example to receive light entering there and generate an electric charge corresponding to a light amount of the light.

In the effective pixel area 30, according to the control by the control unit 53, the pixels 31 receive reflected light of irradiation light emitted by the light emitting unit 11 and supply, to the distance calculation unit 51, an electric charge corresponding to the reflected light, that is, for example, an electric charge amount TapA of the reflected light received during the period of the first light-receiving pulse explained in FIG. 3 and an electric charge amount TapB of the reflected light received during the period of the second light-receiving pulse.

In the dummy pixel area 40, the pixels 41 are, for example, light-shielded and function as so-called optical black (OPB) pixels.

Note that, in FIG. 7, to avoid complexity of the drawing, the pixels 31 composing the effective pixel area 30 and the pixels 41 composing the dummy pixel areas 40 are arranged in a separated area; however, the pixels 41 may be arranged among the pixel 31, for example.

The distance calculation unit 51 calculates reflection time $\Delta t$ (or phase difference $\varphi$) by using the electric charge amount of the electric charge from the pixel 31 as explained in FIG. 3, for example, and calculates the distance L to the target object on the basis of the reflection time $\Delta t$ (which is obtained on the basis of the phase difference $\varphi$). The distance calculation unit 51 calculates a distance L, with respect to each pixel 31 composing the effective pixel area 30 and outputs a distance image or the like that defines (a value corresponding to) the distance L as a pixel value, as distance information.

The random number generation unit 52 generates a random number and supplies the random number to the control unit 53.

The control unit 53 controls the emission of the irradiation light by the light emitting unit 11 and the reception of the reflected light by the pixels 31 in the light receiving unit 12.

In the control of the irradiation light emission and the reflected light reception, the control unit 53 controls the head timing that a subframe sub in the head of the plurality of subframes sub in the frame starts in units of frames on the basis of the random number from the random number generation unit 52. With this configuration, the head timing is randomly changed in units of frames.

Note that, the control unit 53 can control the active state and standby state of (the random number generating process of) the random number generation unit 52, as illustrated in A of FIG. 6.

Here, the distance measurement device 10 may include a chip having a laminated structure that a plurality of substrates are laminated. In FIG. 7, the light receiving unit 12, distance calculation unit 51, random number generation unit 52, and control unit 53 are arranged inside the chip in which the plurality of substrates are laminated. The chip in which the plurality of substrates are laminated is formed as a lower substrate and an upper substrate are laminated from bottom to top in order. In the lower substrate, the distance calculation unit 51, random number generation unit 52, and control unit 53 are formed and, in the upper substrate, the light receiving unit 12 is formed. Since a connecting unit connects between the control unit 53 and light receiving unit 12 and between the distance calculation unit 51 and light receiving unit 12, a signal is transferred between the lower substrate and upper substrate. The connecting unit is, for example, formed of a through silicon via (TSV), Cu—Cu, or the like.

As described above, in the distance measurement device 10 including a chip in which the lower substrate and upper substrate are laminated, the control unit 53 formed in the lower substrate supplies an emission timing signal to the light emitting unit 11 and supplies a light-reception timing signal to the light receiving unit 12. The distance calculation unit 51 calculates a distance by using the emission timing signal and light-reception timing signal. With such a configuration, the chip in which the plurality of substrates are laminated does not have to output image pickup data and only needs to output distance data so that it can be designed with a fewer band of interface. Furthermore, in the lower substrate, an advanced process, which is in a different generation from that of the upper substrate can be used. Furthermore, in the upper substrate, a process, which is dedicated to form a light-receiving element, can be used.

<Process in Control Unit 53>

Figure 8:
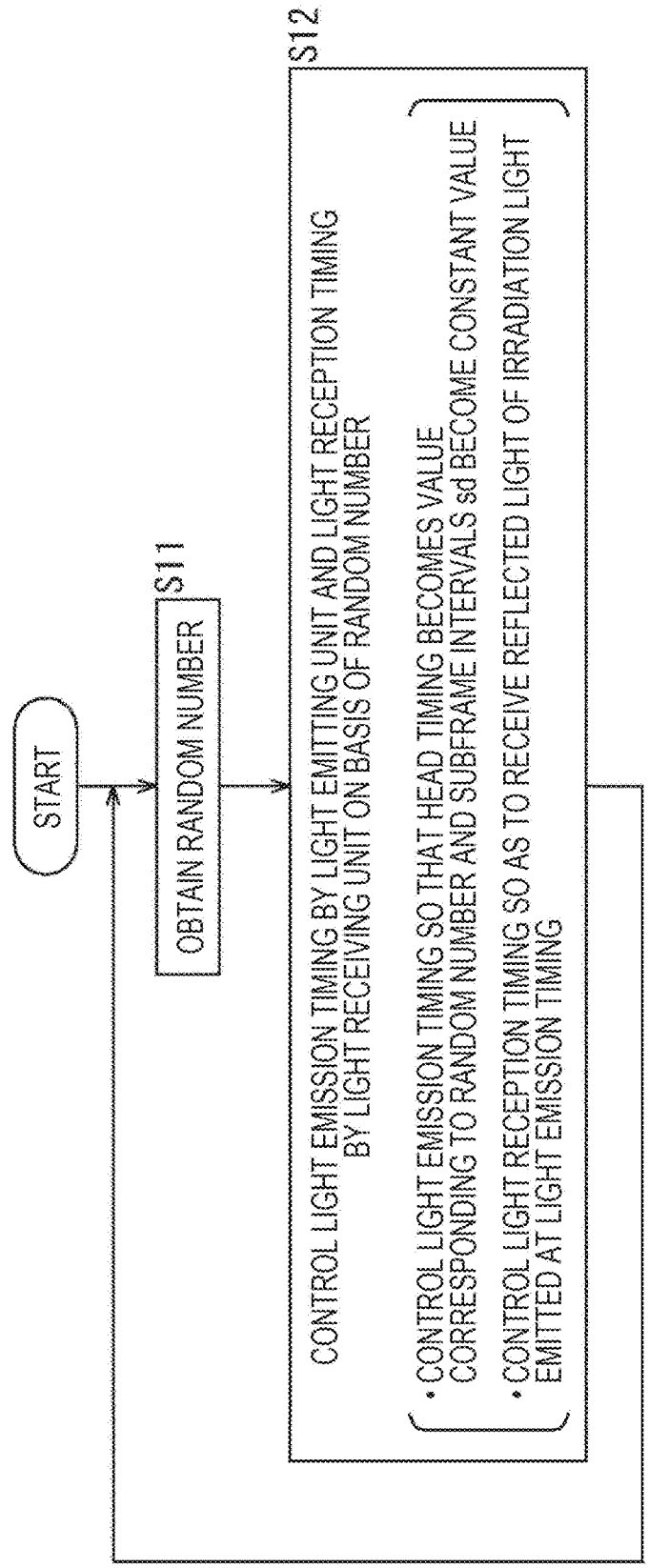
FIG. 8 is a flowchart for explaining an example of a process in a control unit 53.

FIG. 8 is a flowchart for explaining an example of a process in the control unit 53 of FIG. 7.

In step S11, the control unit 53 obtains a random number from the random number generation unit 52 immediately before the frame starts and the process proceeds to step S12.

In step S12, the control unit 53 controls irradiation light emission timing by the light emitting unit 11 and reflected light reception timing by (the pixels 31 of) the light receiving unit 12 immediately after the frame starts, on the basis of the random number obtained from the random number generation unit 52.

In other words, the control unit 53 controls the irradiation light emission timing so that the head timing that the head subframe sub starts becomes a value corresponding to the random number and the intervals sub between the two subframes sub adjacent to each other within the frame becomes constant.

Furthermore, the control unit 53 controls light reception timing of reflected light of the irradiation light emitted at the above-described light emission timing so that the reflected light can be properly received or that the reflection time Δt can be obtained by the second calculation method, for example.

After that, the process returns from step S12 to step S11 and, subsequently, a similar process is repeated.

Note that, in this example, the reflection time Δt is obtained by the second calculation method explained in FIG. 3; however, a method for randomly changing the head timing in units of frames can be applied to a case where the reflection time Δt is obtained by the first calculation method explained in FIG. 2.

In a case where the reflection time Δt is obtained by using the first calculation method, options of the distance L are obtained in each subframe and, on the basis of the options of the distance L of each subframe, for example, a most frequent value, an average value, a maximal value, a minimum value, or the like of the options can be obtained as a final distance L.

Here, in a case where the reflection time Δt is obtained by using the first calculation method, the frame may include a single subframe without the plurality of subframes.

<Second Configuration Example of Distance Measurement Device 10>

Figure 9:
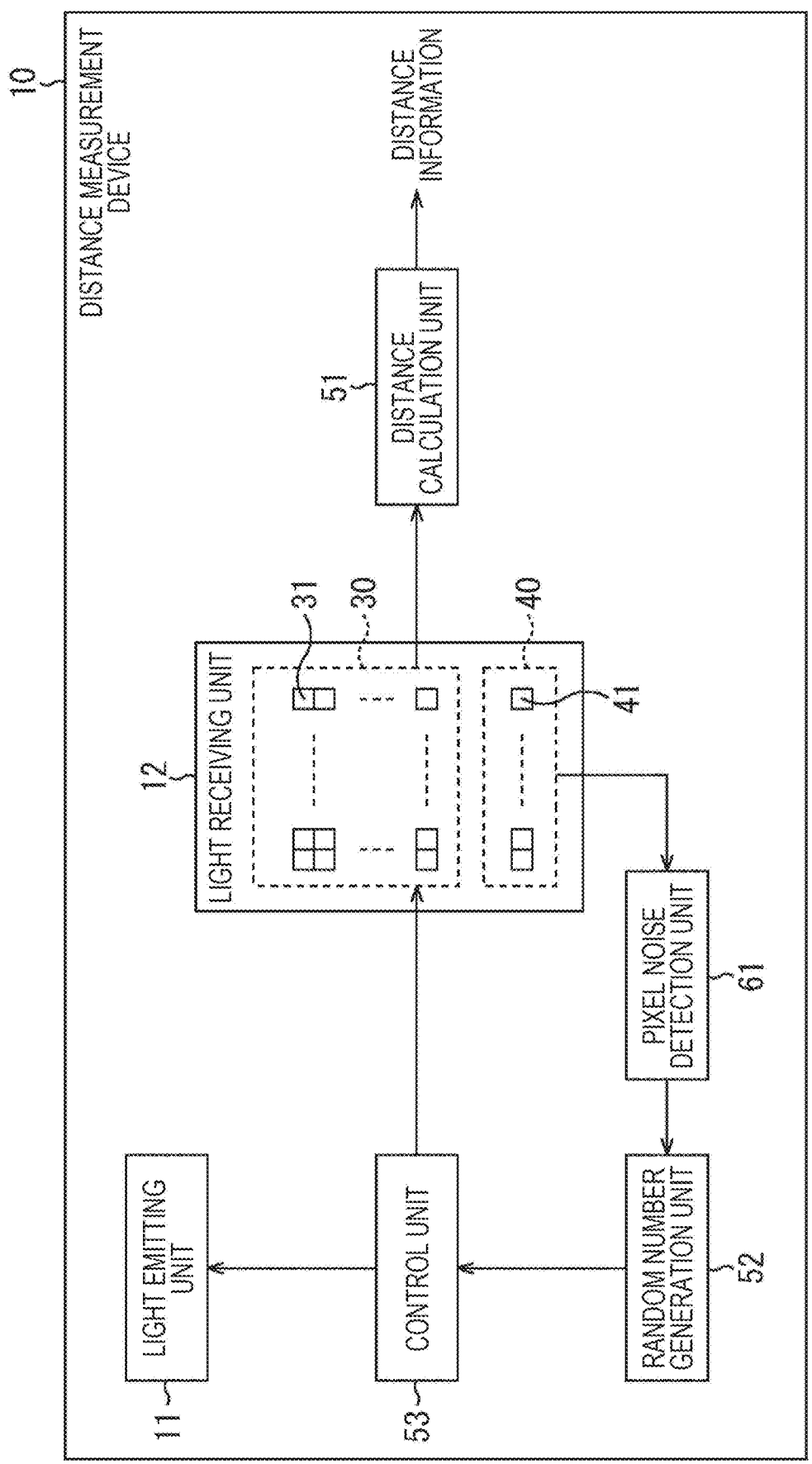
FIG. 9 is a block diagram illustrating a second electrical configuration example of the distance measurement device 10.

FIG. 9 is a block diagram illustrating a second electrical configuration example of the distance measurement device 10 of FIG. 1.

Here, a same reference numeral is applied to a part in the drawing corresponding to a case of FIG. 7 and explanation thereof will be omitted according to need.

In FIG. 9, the distance measurement device 10 includes the light emitting unit 11, light receiving unit 12, distance calculation unit 51, random number generation unit 52, control unit 53, and a pixel noise detection unit 61.

Therefore, the distance measurement device 10 of FIG. 9 is common with the case of FIG. 7 in that the light emitting unit 11, light receiving unit 12, distance calculation unit 51, random number generation unit 52, and control unit 53 are included.

Note that the distance measurement device 10 of FIG. 9 is different from the case of FIG. 7 in that the pixel noise detection unit 61 is newly provided.

The pixel noise detection unit 61, for example, detects an electric charge amount of the pixel 41, which is an OPB pixel as a pixel noise generated in the pixels 31 or 41 and supplies the detected electric charge amount to the random number generation unit 52.

Note that the pixel noise detection unit 61 can select a plurality of pixels 41 in the dummy pixel area 40 in a specific order or any order and detect electric charge amounts of the selected pixels 41 as pixel noise.

In the distance measurement device 10 of FIG. 7, the random number generation unit 52 generates a random number by using a previously determined value as a seed of a random number, for example.

On the other hand, the distance measurement device 10 of FIG. 9 generates a random number on the basis of information generated in the light receiving unit 12. More specifically, the random number generation unit 52 generates a random number by using pixel noise supplied from the pixel noise detection unit 61 as a seed of a random number.

Characteristics of pixel noise of the pixels 31 or pixels 41 are (approximately) random characteristics and (possibility of occurrence of) interference can be further suppressed by generating a random number by using such random characteristics as a seed of pixel noise and controlling the head timing on the basis of the random number.

Note that characteristics of (an accuracy of) the pixels 31 are random characteristics which are similar to the characteristics of the pixel noise of the pixels 31 or pixels 41 (characteristics of the pixel 31=random characteristics).

Further, in the distance measurement device 10, interference suppression characteristics are characteristics inversely proportional to random characteristics which are similar to the characteristics of pixel noise of the pixels 31 or pixels 41 (characteristics of interference suppression=1/random characteristics).

On the other hand, distance measurement accuracy of the distance measurement device 10 is proportional to a product of the characteristics of the pixels 31 and the interference suppression characteristics.

As described above, since the characteristics of the pixels 31 are random characteristics, and the interference suppression characteristics are inversely proportional to the random characteristics, a product of the characteristics of the pixels 31 (=random characteristics) and the interference suppression characteristics (=1/random characteristics) become one, which is a constant.

Thus, in the distance measurement device 10, in a case where the random number is generated by using the pixel noise as a seed and the head timing is controlled on the basis of the random number, the distance measurement accuracy can be maintained (almost) constant.

In the distance measurement device 10, as another method for generating a random number by using a signal component detected by the light receiving unit 12, there may be a method for generating a random number by using a random component of the ambient light or a method for generating a random number by using a random component of noise of a circuit in the light receiving unit 12.

As an illustrative example of the method for generating a random number by using a random component of the ambient light, subframes to measure data related to the ambient light is provided in a period that the four subframes sub of FIG. 4 are not measured (a period that the irradiation light is not emitted) and a random component of the measured ambient light is used to generate a random number. A wavelength component or the like of the ambient light generally has random characteristics, and (a possibility of occurrence of) interference can be suppressed by generating a random number by using such a component of the ambient light having random characteristics as a seed and controlling the head timing of the subframes on the basis of the random number. The measured value of the ambient light is stored in an unillustrated memory, and the measured value of the ambient light stored in the memory can be used in two ways, which are a usage for removing the above-described ambient light component and a usage for generating a random number to change timing of light emission in the head of the subframes. With this configuration, a random number can be generated without newly providing a random number generator and consumed power can be suppressed.

In an illustrative example of a method for generating a random number by using a random component of noise of a circuit in the light receiving unit 12, a random component generated when an unillustrated analog-digital converter (AD converter) included in the light receiving unit 12 is activated is used to generate a random number. In general, in the AD converter, an output digital signal is not always stiltedly maintained constant due to production irregularity or the like. In other words, even in a case where same light is inserted and a plurality of same analog signals are input, output digital signals have slight irregularity. This irregularity generally has almost random characteristics, and (a possibility of occurrence of) interference can be suppressed by generating a random number by using such a component of the ambient light having random characteristics as a seed and controlling the head timing of the subframes on the basis of the random number. As an example, a fixed analog value is forcedly inserted to an AD converter connected to the dummy pixels 40. Theoretically, a fixed digital value is output in response to this insertion; however, in actual, the values are slightly different from the theoretical value. By measuring the difference, a random number is generated. Here, the pixels to which the fixed analog value is forcedly inserted may be the pixels in the effective pixel area 30. In this case, it is preferable that the fixed analog value is forcedly inserted at timing when the light emitting unit 11 is not emitting light or at timing when the light receiving unit 12 is not receiving light. With the above-described method, a random number can be generated without newly providing a random number generator and the consumed power can be suppressed.

Note that, the above-described three method for generating a random number by using a signal component detected by the light receiving unit 12 (the method for generating a random number by using pixel noise, a method for generating a random number by using a random component of ambient light, and a method for generating a random number by using a random component of noise of a circuit) may be respectively and independently executed or more than one of them may be combined and executed. In a case where more than one of the methods are combined and executed, randomness can be improved compared to a case where the methods are independently executed.

The distance measurement device 10 can be mounted in a vehicle so that the light emitting unit 11 emits irradiation light toward outside the vehicle. Note that, in the second configuration example of the distance measurement device 10, a chip having a laminated structure may be used.

<Example of Application to Moving Body>

The technology related to this disclosure (the present technology) can be applied to various products. For example, the technology related to this disclosure can be realized as a device to be mounted in a moving body in any one of types including vehicles, electric vehicles, hybrid electric vehicles, motorcycles, bicycles, personal mobilities, airplanes, drones, vessels, robots, and the like.

Figure 10:
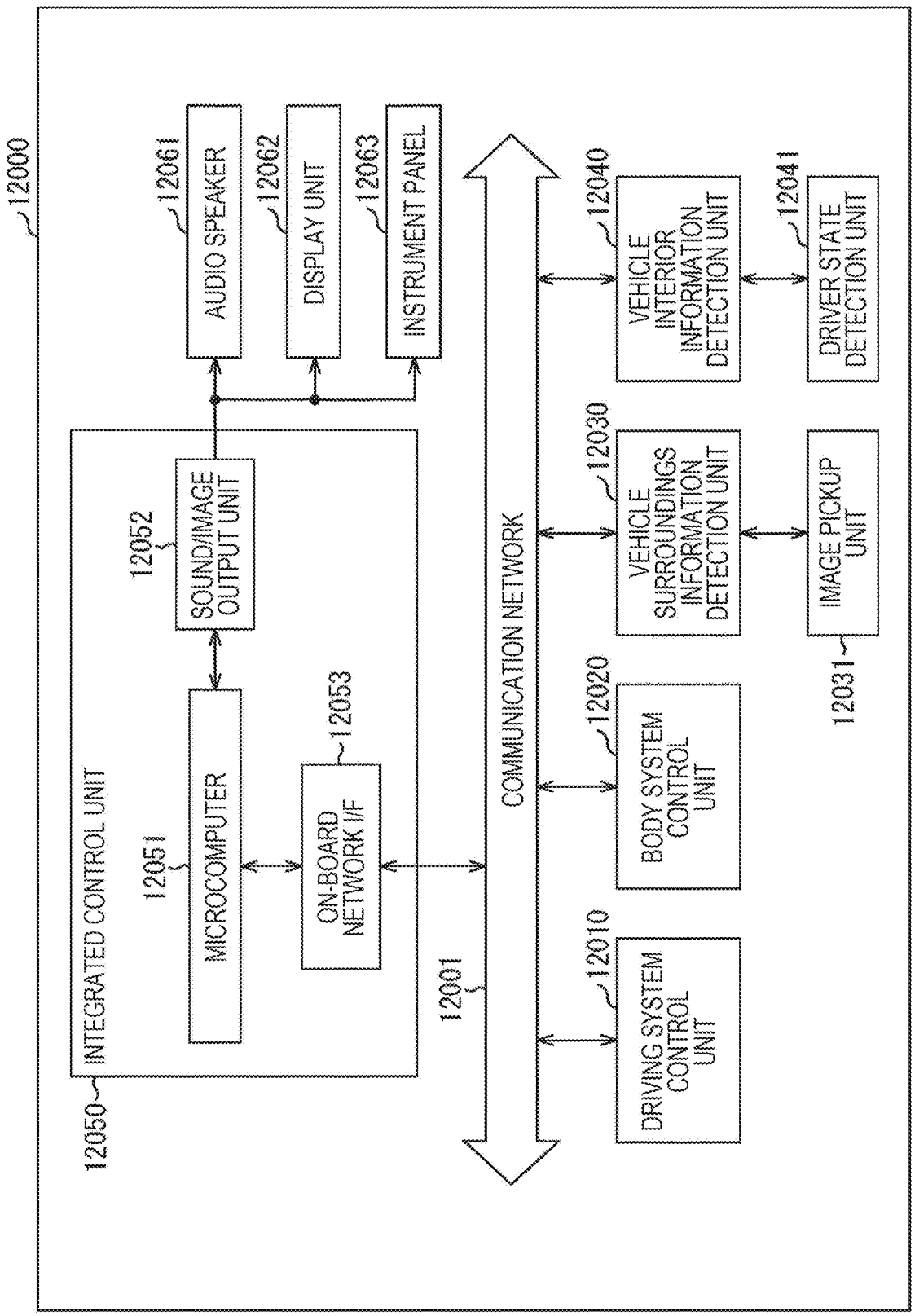
FIG. 10 is a block diagram illustrating a schematic configuration example of a vehicle control system.

FIG. 10 is a block diagram illustrating a schematic configuration example of a vehicle control system as an example of a moving body control system to which the technology related to this disclosure can be applied.

A vehicle control system 12000 includes a plurality of electronic control units connected via a communication network 12001. In the example illustrated in FIG. 10, the vehicle control system 12000 includes a driving system control unit 12010, a body system control unit 12020, a vehicle surroundings information detection unit 12030, a vehicle interior information detection unit 12040, and an integrated control unit 12050. Furthermore, as a functional configuration of the integrated control unit 12050, a microcomputer 12051, a sound/image output unit 12052, and an on-board network interface (I/F) 12053 are illustrated.

The driving system control unit 12010 controls operation of a device related to a vehicle driving system according to various programs. For example, the driving system control unit 12010 functions as a control device such as a driving force generation device for generating a driving force of a vehicle such as an engine or a drive motor, a driving force transmission mechanism for transmitting the driving force to a wheel, a steering mechanism for adjusting a vehicular steering angle, and a braking system for generating vehicular braking force.

The body system control unit 12020 controls operation of various devices mounted in the vehicle according to various programs. For example, the body system control unit 12020 functions as a control device of a keyless entry system, a smart key system, a power window device, or various lamps such as a head lamp, a back lamp, a brake lamp, a blinker, and a fog lamp. In this case, to the body system control unit 12020, radio waves or signals of various switches sent from a mobile device serving as a substitute of a key can be input. The body system control unit 12020 receives these inputs of radio wave or signals and controls a door lock device, a power window device, a lamp, or the like of the vehicle.

The vehicle surroundings information detection unit 12030 detects information from the outside of the vehicle in which the vehicle control system 12000 is mounted. For example, to the vehicle surroundings information detection unit 12030, the image pickup unit 12031 is connected. The vehicle surroundings information detection unit 12030 makes the image pickup unit 12031 pickup an image of the outside of the vehicle and receives the pickup image. On the basis of the received image, the vehicle surroundings information detection unit 12030 may perform an object detection process including a person, a vehicle, an obstacle, a sign, a letter on a street surface, or the like or a distance detection process.

The image pickup unit 12031 is an optical sensor that receives light and outputs an electrical signal corresponding to a light-receiving amount of the light. The image pickup unit 12031 can output the electric signal as an image or output it as distance measurement information. Furthermore, the light the image pickup unit 12031 receives may be visible light or invisible light such as infrared light.

The vehicle interior information detection unit 12040 detects information inside the vehicle. To the vehicle interior information detection unit 12040, for example, a driver state detection unit 12041 for detecting a state of a driver is connected. The driver state detection unit 12041 includes, for example, a camera for capturing an image of the driver, and the vehicle interior information detection unit 12040 may calculate a fatigue degree or a concentration degree of the driver on the basis of the detection information input from the driver state detection unit 12041 or may determine if the driver is surely awake.

The microcomputer 12051 can calculates a control target value of the driving force generation device, steering mechanism, or braking system on the basis of the vehicle interior and surroundings information obtained in the vehicle surroundings information detection unit 12030 or vehicle interior information detection unit 12040 and output a control command to the driving system control unit 12010. For example, the microcomputer 12051 can perform a coordinate control aiming to realize an advanced driver assistance system (ADAS) function including collision avoidance or impact relaxation of the vehicle, following travel based on an inter-vehicular distance, vehicle speed maintaining travel, vehicular collision-warning, vehicular lane departure warning, or the like.

Furthermore, the microcomputer 12051 can perform a coordinate control aiming at an automatic operation for autonomously traveling regardless of the driver's operation, or the like by controlling the driving force generation device, steering mechanism, braking system, or the like on the basis of vehicle surroundings information obtained by the vehicle surroundings information detection unit 12030 or vehicle interior information detection unit 12040.

Furthermore, the microcomputer 12051 can output a control command to the body system control unit 12020 on the basis of vehicle surroundings information obtained by the vehicle surroundings information detection unit 12030. For example, the microcomputer 12051 can control the head lamp according to a position of a preceding vehicle or an oncoming vehicle detected by the vehicle surroundings information detection unit 12030 and perform a coordinate control aiming to antidazzle by switching high beam to low beam, or the like.

The sound/image output unit 12052 transmits an output signal of at least one of a sound or an image to an output device which can visually or aurally notify a vehicular passenger or the outside of the vehicle of information. In the example of FIG. 10, as the output device, an audio speaker 12061, a display unit 12062, and an instrument panel 12063 are exemplified. The display unit 12062 may include, for example, at least one of an on-board display or a head-up display.

Figure 11:
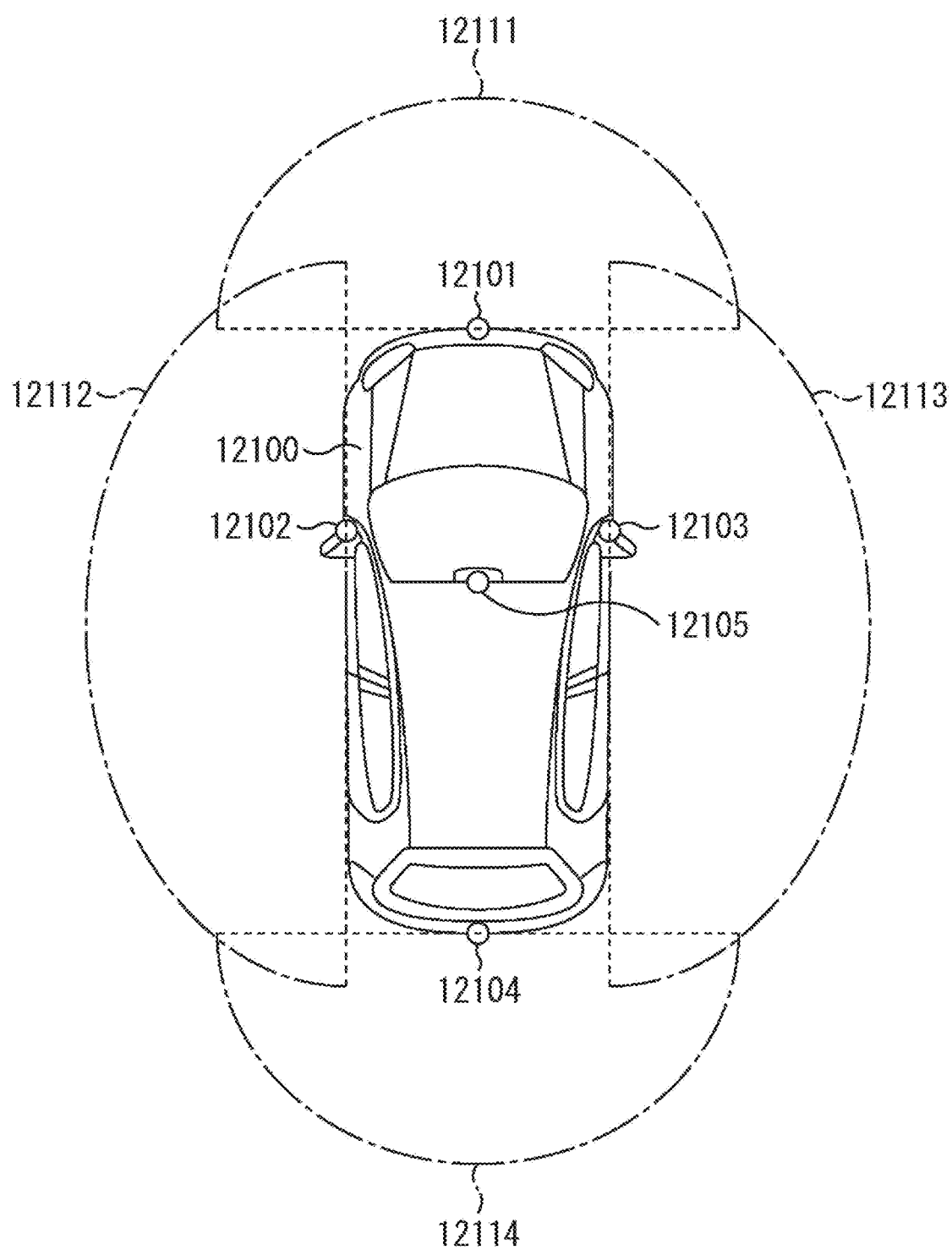
FIG. 11 is an explanatory view illustrating examples of mounted positions of image pickup units.

FIG. 11 is a diagram illustrating an example of a mounted position of the image pickup unit 12031.

In FIG. 11, the vehicle 12100 includes image pickup units 12101, 12102, 12103, 12104, and 12105 as the image pickup unit 12031.

The image pickup units 12101, 12102, 12103, 12104, and 12105 are provided at positions on a front nose, side mirrors, a rear bumper, a back door, an upper portion of a windshield inside the vehicle, or the like of the vehicle 12100, for example. The image pickup unit 12101 provided on the front nose and the image pickup unit 12105 provided on the upper portion of the windshield inside the vehicle mainly obtain an image in front of the vehicle 12100. The image pickup units 12102 and 12103 provided at the side mirrors mainly obtain images in sides of the vehicle 12100. The image pickup unit 12104 provided at the rear bumper or back door mainly obtains an image behind the vehicle 12100. The images in front obtained by the image pickup units 12101 and 12105 are mainly used to detect a preceding vehicle, a pedestrian, an obstacle, a traffic signal, a traffic sign, a lane, or the like.

Note that FIG. 11 illustrates an example of coverages of the image pickup units 12101 to 12104. A coverage 12111 represents the coverage of the image pickup unit 12101 provided at the front nose, coverages 12112 and 12113 represents the coverages of the image pickup units 12102 and 12103 respectively provided at the side mirror, and a coverage 12114 represents the coverage of the image pickup unit 12104 provided to the rear bumper or back door. For example, a high-angle image of the vehicle 12100 seen from the above can be obtained by overlaying the images taken by the image pickup units 12101 to 12104.

At least one of the image pickup units 12101 to 12104 may have a function for obtaining distance information. For example, at least one of the image pickup units 12101 to 12104 may be a stereo camera including a plurality of image pickup elements or may be an image pickup element having a pixel for detecting a phase difference.

For example, the microcomputer 12051 can extract a three-dimensional object, which is especially existing closest to the vehicle 12100 on a roadway in a traveling direction and is traveling at a predetermined speed (for example, equal to or greater than 0 km/h) in an almost same direction with the vehicle 12100 as a preceding vehicle by obtaining distances to each three-dimensional object within the coverages 12111 to 12114 and temporal variation of the distances (relative velocity with respect to the vehicle 12100) on the basis of the distance information obtained from the image pickup units 12101 to 12104. Furthermore, the microcomputer 12051 sets an inter-vehicular distance, which is to be maintained, before the preceding vehicle in advance, and can perform an automatic brake control (also including a follow-up stoppage control), an automatic acceleration control (also including a follow-up start control), and the like. A coordinate control aiming at an automatic operation for autonomously traveling regardless of the driver's operation in this manner, or the like can be performed.

For example, the microcomputer 12051 extracts three-dimensional object data related to the three-dimensional object as classifying into other three-dimensional objects such as motorcycles, typical vehicles, large-sized vehicle vehicles, pedestrians, and utility poles on the basis of the distance information obtained from the image pickup units 12101 to 12104, and the extracted three-dimensional object data can be used in an obstacle automatic avoidance. For example, the microcomputer 12051 identifies obstacles around the vehicle 12100 into obstacles visible by the driver of the vehicle 12100 and obstacles hardly visible by the driver. Then, the microcomputer 12051 determines a collision risk indicating a risk of colliding with each obstacle and, in a condition that the collision risk is equal to or greater than a set value and there is a possibility of a collision, a drive assist for a collision avoidance by outputting a warning to the driver via the audio speaker 12061 or display unit 12062 or performing forced deceleration or avoidance steering via the driving system control unit 12010.

At least one of the image pickup units 12101 to 12104 may be an infrared camera, which detects infrared ray. For example, the microcomputer 12051 can recognize pedestrians by determining whether or not there is a pedestrian in captured images of the image pickup units 12101 to 12104. This pedestrian recognition is performed, for example, by a procedure for extracting a characteristic point in the captured images of the image pickup units 12101 to 12104, which are infrared cameras or a procedure for determining whether or not the obstacle is a pedestrian by performing a pattern matching process on a series of characteristic points, which indicates an outline of the obstacle. In a case where the microcomputer 12051 determines that there is a pedestrian in the captured images of the image pickup units 12101 to 12104 and recognizes the pedestrian, and the sound/image output unit 12052 controls the display unit 12062 to superimposedly display a rectangular outline that emphasizes the recognized pedestrian. Furthermore, the sound/image output unit 12052 may control the display unit 12062 to display an icon or the like indicating the pedestrian in a desired position.

In the above, an example of a vehicle control system to which the technology related to the present disclosure can be applied has been explained. The technology related to the present disclosure can be applied to the image pickup unit 12031 in the above-described configuration. More specifically, the distance measurement device 10 can be applied to the image pickup unit 12031. By applying the technology related to the present disclosure to the image pickup unit 12031, in the distance measurement, interference can be easily suppressed and distance information that contributes to the drive assist can be provided.

<Description of Computer to which the Present Technology is Applied>

Next, the above-described series of processes by the distance calculation unit 51, control unit 53, or the like may be executed by hardware or may be executed by software. In a case where the series of processes is performed by software, a program composing the software is installed to the computer.

Figure 12:
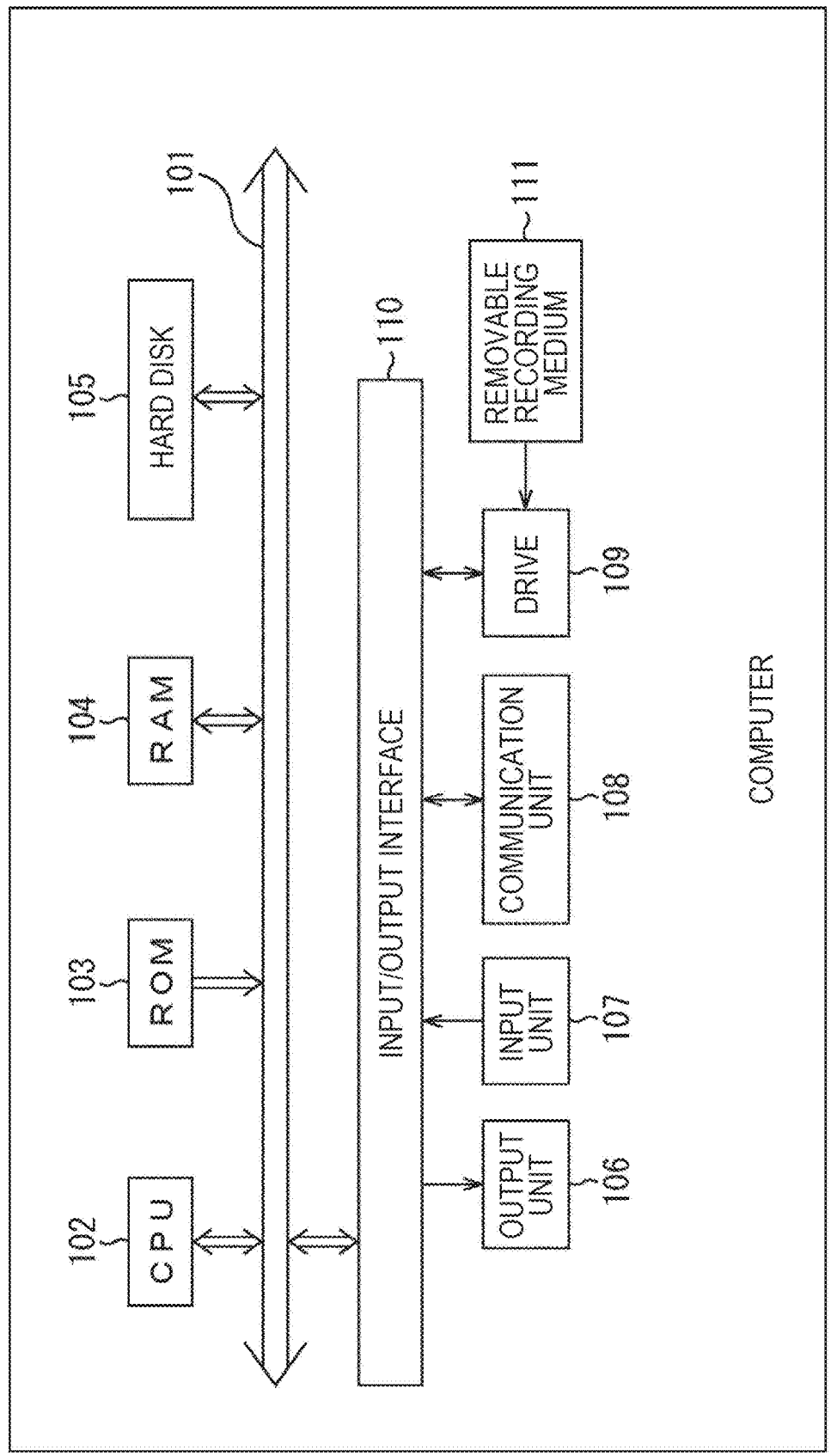
FIG. 12 is a block diagram illustrating a configuration example of an embodiment of a computer to which the present technology is applied.

Here, FIG. 12 illustrates a configuration example of an embodiment of a computer to which a program that executes the above-described series of processes is installed.

The program can be recorded in advance in a hard disk 105 or a ROM 103, which is a recording medium mounted in the computer.

Alternatively, the program can be stored (recorded) in a removable recording medium 111. The removable recording medium 111 can be provided as a so-called packaged software. Note that, as the removable recording medium 111, for example, there are a flexible disk, a compact disc read only memory (CD-ROM), a magneto optical (MO) disc, a digital versatile disc (DVD), a magnetic disk, a semiconductor memory, and the like.

Note that the program may be installed to the computer via the above-described removable recording medium 111 or may be downloaded to the computer via a communication network or a broadcast network and installed to the internal hard disk 105. In other words, the program may be wirelessly transferred to the computer from the download site via an artificial satellite used for digital satellite broadcasting for example, or may be weirdly transferred to the computer via a network such as a local area network (LAN) and the Internet.

The computer internally includes a central processing unit (CPU) 102 and, to the CPU 102, an input/output interface 110 is connected via a bus 101.

In a case where a user operates an input unit 107 or the like via the input/output interface 110 and a command is input, the CPU 102 executes the program stored in the read only memory (ROM) 103 in response to the command. Alternatively, the CPU 102 loads the program stored in the hard disk 105 to a random access memory (RAM) 104 and executes the program.

With this configuration, the CPU 102 performs a process according to the above-described flowchart or a process performed by the above-described configuration of the block diagram. Then, the CPU 102 outputs the process result from the output unit 106 via the input/output interface 110, for example, according to need, transmits the process result from the communication unit 108, and further, records the process result in the hard disk 105.

Note that the input unit 107 includes a keyboard, a mouse, a microphone, or the like. Furthermore, the output unit 106 includes a liquid crystal display (LCD), a speaker, and the like.

Here, in this specification, the processes that the computer executes according to the program do not need to be always executed in chronological order according to the order described in the flowchart. In other words, the processes that the computer executes according to the program include processes executed in parallel or independently (for example, parallel processing or processing by an object).

Furthermore, the program may be a program processed by a single computer (processor), or a program distributedly processed by a plurality of computers.

Furthermore, in the present specification, the system represents a collection of a plurality of component elements (devices, modules (parts), and the like) and all component elements do not have to be in a same housing. Thus, a plurality of devices provided in separate housings and connected via a network and a single device in which a plurality of modules are provided in a single housing are both referred to as a system.

Note that the embodiment according to the present technology is not limited to the above-described embodiment and various changes can be made within the scope of the present technology.

Furthermore, the effects described in this specification are examples and should not be limited and there may be other effects.

Note that the present technology may have the following configurations.

<1>

A distance measurement device including:

a light emitting unit configured to emit irradiation light;

a light receiving unit configured to receive reflected light which is the irradiation light reflected by a target object;

a calculation unit configured to calculate a distance to the target object on the basis of time between the emission of the irradiation light and the reception of the reflected light; and a control unit configured to control the emission of the irradiation light, in which a frame being a period that the distance is calculated includes a plurality of subframes being periods that the irradiation light is emitted, and the control unit controls the emission of the irradiation light so that, between a first frame and a second frame following the first frame, timing of head subframes differs and intervals between the subframes become constant.

<2>

The distance measurement device according to <1>, in which timing of the head subframes randomly changes in units of frames.

<3>

The distance measurement device according to <2>, further including a random number generation unit configured to generate a random number, in which the control unit controls timing of the head subframes on the basis of the random number.

<4>

The distance measurement device according to <3>, in which the light receiving unit includes a plurality of pixels, and the random number generation unit generates the random number on the basis of an electric charge amount of a predetermined pixel in the plurality of pixels.

<5>

The distance measurement device according to any one of <1> to <4>, the distance measurement device being mounted in a vehicle, in which the light emitting unit emits irradiation light toward outside of the vehicle.

<6>

A distance measurement method, including:

a light emitting unit configured to emit irradiation light;

a light receiving unit configured to receive reflected light that is the irradiation light reflected by a target object;

a calculation unit configured to calculate a distance to the target object on the basis of time between the emission of the irradiation light and the reception of the reflected light; and a control unit configured to control the emission of the irradiation light, in which a frame being a period that the distance is calculated, includes a plurality of subframes being periods that the irradiation light is emitted, and the control unit of the distance measurement device controls the emission of the irradiation light so that timing of head subframes differs between the first frame and a second frame following the first frame and intervals between the subframes become constant.

REFERENCE SIGNS LIST

10 Distance measurement device
11 Light emitting unit
12 Light receiving unit
30 Effective pixel area
31 Pixel
40 Dummy pixel area
41 Pixel
51 Distance calculation unit
52 Random number generation unit
53 Control unit
61 Pixel noise detection unit
101 Bus
102 CPU
103 ROM
104 RAM
105 Hard disk
106 Output unit
107 Input unit
108 Communication unit
109 Drive
110 Input/output interface
111 Removable recording medium

The invention claimed is:

1. A distance measurement device comprising:
circuitry configured to function as:
a light emitting unit configured to emit irradiation light;
a light receiving unit configured to receive reflected light which is the irradiation light reflected by a target object;
a calculation unit configured to calculate a distance to the target object on a basis of time between the emission of the irradiation light and the reception of the reflected light;
a random number generation unit configured to generate a random number on a basis of information generated in the light receiving unit; and
a control unit configured to control the emission of the irradiation light,
wherein a first frame being a period that the distance is calculated includes a plurality of subframes being periods that the irradiation light is emitted, and
the control unit controls the emission of the irradiation light so that, between the first frame and a second frame following the first frame, timing of head subframes differs and, during the period of the first frame, intervals between the subframes become constant.

2. The distance measurement device according to claim 1, wherein the timing of the head subframes randomly changes in units of the frames.

3. The distance measurement device according to claim 2, wherein the control unit controls the timing of the head subframes on a basis of the random number.

4. The distance measurement device according to claim 3, wherein the light receiving unit includes a plurality of pixels, and
the random number generation unit generates the random number on a basis of an electric charge amount of a predetermined pixel in the plurality of pixels.

5. The distance measurement device according to claim 4, wherein the predetermined pixel is an optical black pixel.

6. The distance measurement device according to claim 3, wherein the first frame includes a period that the irradiation light is not emitted, and the random number generation unit generates the random number on a basis of information of light that the light receiving unit receives during the period that the irradiation light is not emitted.

7. The distance measurement device according to claim 3, wherein the light receiving unit includes a plurality of AD converters, and the random number generation unit generates the random number on a basis of digital signals generated by the plurality of AD converters.

8. The distance measurement device according to claim 3, wherein the random number generation unit has an active state that the random number is generated and a standby state for being standby to shift to the active state, and
the active state starts before the first frame starts and the standby state starts after the first frame starts.

9. The distance measurement device according to claim 1, wherein the light receiving unit is provided in a first substrate, and
at least one of the control unit or the calculation unit is provided in the second substrate laminated on the first substrate.

10. The distance measurement device according to claim 1, the distance measurement device being mounted in a vehicle, wherein the light emitting unit emits the irradiation light toward outside the vehicle.

11. A distance measurement method of a distance measurement device, the method comprising:
- emitting irradiation light;
- receiving reflected light which is the irradiation light reflected by a target object;
- calculating a distance to the target object on a basis of time between the emission of the irradiation light and the reception of the reflected light;
- generating a random number on a basis of information generated after receiving the reflected light; and
- controlling the emission of the irradiation light,
- wherein a first frame being a period that the distance is calculated includes a plurality of subframes being periods that the irradiation light is emitted, and
- controlling the emission of the irradiation light is such that, between the first frame and a second frame following the first frame, timing of head subframes differs and intervals between the subframes become constant during a period of the first frame.

12. A distance measurement device, comprising:
circuitry configured to function as:
- a light emitting unit configured to emit irradiation light;
- a light receiving unit configured to receive reflected light which is the irradiation light reflected by a target object;
- a calculation unit configured to calculate a distance to the target object on a basis of time between the emission of the irradiation light and the reception of the reflected light;
- a random number generation unit configured to generate a random number on a basis of information generated in the light receiving unit; and
- a control unit configured to control at least a part of the emission of the irradiation light on a basis of the random number.

13. The distance measurement device according to claim 12, wherein the light receiving unit includes a plurality of pixels, and
the random number generation unit generates the random number on a basis of an electric charge amount of a predetermined pixel in the plurality of pixels.

14. The distance measurement device according to claim 13, wherein the predetermined pixel is an optical black pixel.

15. The distance measurement device according to claim 12, wherein the random number generation unit generates the random number on a basis of information of light that the light receiving unit receives during the period that the irradiation light is not emitted.

16. The distance measurement device according to claim 12, wherein the light receiving unit includes a plurality of AD converters, and the random number generation unit generates the random number on a basis of digital signals generated by the plurality of AD converters.

17. The distance measurement device according to claim 12, wherein the light receiving unit is provided in a first substrate, and at least one of the control unit or the calculation unit is provided in the second substrate laminated on the first substrate.

18. The distance measurement device according to claim 12, the distance measurement device being mounted in a vehicle, wherein the light emitting unit emits the irradiation light toward outside the vehicle.

* * * * *